No. 642,090. Patented Jan. 30, 1900.
J. R. DIXON.
COMBINED COOP AND BROODER.
(Application filed June 17, 1898.)
(No Model.)
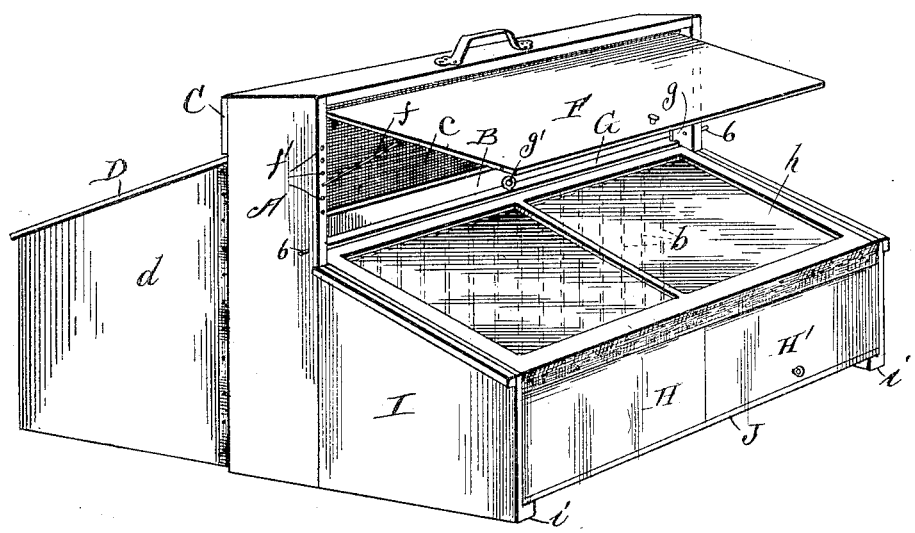
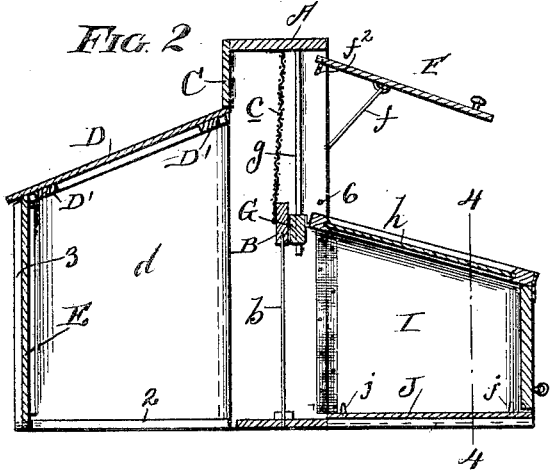
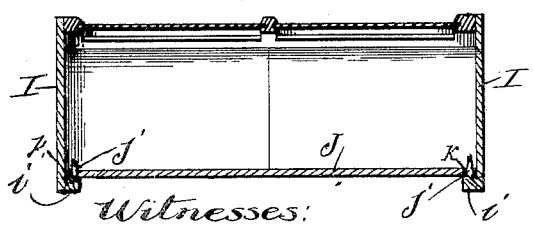
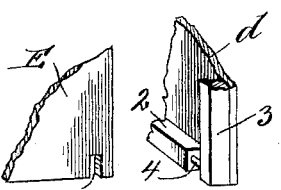
Witnesses:
R. J. Jaeker
F. S. Thomason
Inventor:
John R. Dixon
By Frank D. Thomason
THE NORRIS PETERS CO., PHOTO-LITHO., WASHINGTON, D. C.

UNITED STATES PATENT OFFICE.

JOHN R. DIXON, OF CHICAGO, ILLINOIS.

COMBINED COOP AND BROODER.

SPECIFICATION forming part of Letters Patent No. 642,090, dated January 30, 1900.

Application filed June 17, 1898. Serial No. 683,747. (No model.)

*To all whom it may concern:*

Be it known that I, JOHN R. DIXON, a citizen of the United States, and a resident of Chicago, in the county of Cook and State of Illinois, have invented certain new and useful Improvements in a Combined Coop and Brooder, of which the following is a full, clear, and exact description, reference being had to the accompanying drawings, and to the letters and figures of reference marked thereon.

One of the greatest objections to the use of chicken coops and brooders is their clumsiness, and another is the exposure of the tender chicks in all kinds of weather unless the coop is closed and darkened.

The objects of my invention are, first, to make a combined coop and brooder which is so constructed that it can provide separate compartments for the hen and for the brood, both of which can be suitably ventilated, but the latter of which is closed to the hen and is floored and can be opened or closed to the outside and is provided with a glass roof and an overhanging awning, and, second, to so construct it that it can be "knocked down" and folded up for storage or transportation in a very compact space. This I accomplish by the means hereinafter fully described and as particularly pointed out in the claims.

In the drawings, Figure 1 is a perspective view of my invention, showing the same opened and ready for use. Fig. 2 is a longitudinal section through the same, showing it opened. Fig. 3 is a similar view showing it knocked down and folded. Fig. 4 is a transverse vertical section taken on dotted line 4 4, Fig. 2, looking in the direction indicated by the arrows. Fig. 5 is a detail view showing in perspective the broken-away lower rear corner of the rear and side walls of the hen-coop.

In the drawings, A represents the central rectangular open frame of my invention, which serves as a case, within which the parts of my invention are inclosed and folded when my invention is knocked down, and serves as a central main structure to which the coop on one side thereof and the brooder on the other side occupy the relation of what is known in building vernacular as a "lean to." About the center of its height and midway its short length the vertical sides of frame A are connected by a horizontal cross-bar B, and connecting the lower edge of this bar with the floor side of frame A is a series of vertical rods forming a grating $b$, which extends from side to side of said frame and through which the chicks can easily pass, but are arranged too close for the hen to succeed in doing so. The space above bar B is closed to prevent the escape of the hen, but open to free circulation of air by a wire gauze or netting $c$, which has its side edges connected in suitable manner to said bar B and the vertical sides and top of frame A.

The upper portion of the rear edges of the vertical sides of frame A are connected by a short drop-wall C, which depends from the rear edge of the top of the same, and below this drop-wall the said rear edges of frame A have hinged thereto, preferably by suitable strips of canvas or burlap webbing, the side walls $d$ of the hen-coop. The width of these side walls corresponds to slightly less than the width of frame A, and their upper edges are preferably inclined toward the rear and are covered over by a roof-board D. The rear ends of the side walls $d$ when the coop is open are connected by a suitable rear wall E. The inner surfaces of the vertical rear ends of side walls $d$, as well as the lower edges of the same, are reinforced by horizontal and vertical guide-cleats 2 and 3; but the lower cleats 2 do not extend to cleats 3, but are separated therefrom by a short space corresponding to the thickness of the rear wall E, which is bridged over by a short rail 4. The lower edge of the rear wall E near each vertical side is provided with vertical slots 5 therein, and when fitting said rear wall in place its side edges are laid flat against the forward edge of cleats 2 and then moved downward, so that rails 4 enter slots 5, and thus hold said side walls $d$ in parallel longitudinal planes. The upper edge of the said rear wall is held by the roof-board D, the under side of which is provided near its forward and rear edges, respectively, with transverse cleats D' of a length corresponding to the distance between the said side walls when the coop is open and so arranged that when in position one of said cleats rests and bears against the upper edge of the rear wall as well as preserving the distance between said side walls.

When knocked down, the roof D is lifted off and the rear wall E disconnected by lifting it slightly, so as to unlock its lower corners, and then spreading the side walls farther apart, whereupon both the said roof and rear wall are placed in the central frame A flat against each other and against grating $b$ and bar B, in which position they are confined by closing side walls $d$, like doors, in against the same and securing said doors together by a hasp or in any other suitable manner.

The upper half of the front of frame A is closed by a swinging awning F, of board or other suitable material, the upper end of the side edges of which are pivoted, as shown, between the vertical sides of frame A. This awning is held in its open position by one or two brace-rods $f$, which have their upper ends pivoted to a suitable staple secured to the under side of said awning near its side edges and the lower end of which is adapted to be inserted in one of the series of vertically-arranged holes $f'$ in the forward edges of the vertical sides of frame A. When it is desired to close this awning, it is raised slightly, so as to permit the removal of the lower ends of rods $f$ from the holes $f'$, and then said rods are swung upward toward the pivoted edge of the awning and caught and held by a hook $f^2$, whereupon the said awning is swung into position and there held by lateral locking-pins 6, shot through transverse holes in the vertical sides of frame A and entering suitable holes in the edges of said awning.

Secured to the upper half of the inner surface of the vertical sides of frame A, immediately in front of bar B and the wire-gauze $c$, are vertical rods $g$, and movable vertically on these rods is a horiozntal cross-head G, which is of such length that said rods enter corresponding vertical grooves in its ends. This cross-head is provided at about its center of length with a suitable ring or hand-grasp $g'$, and it has hinged to its front surface, preferably by means of a suitable strip of canvas or burlap webbing, the glass roof $h$ of the brooder, and this glass roof has hinged to its outer edge, preferably by the same means, two corresponding drop-doors H H', which together constitute the front wall of the brooder when in the position shown in Figs. 1 and 2 of the drawings. When it is desired to fold this glass roof into frame A, the cross-head G is raised to near the top of said frame, thus bringing said roof and the doors H H' into the position shown in Fig. 3. To hold the glass roof in the set-up position shown in Figs. 1 and 2, the side walls I I are used. These side walls I have their higher vertical edges hinged, preferably by means of canvas or burlap webbing, to the inner surface of the sides of frame A next the lower portion of the front edges thereof and so that the lower edges of said side walls I are on the same plane as the bottom of frame A. The length of these side walls corresponds to about one-half the width of the frame A, and their upper edges are inclined from their hinged ends to the outer ends. I prefer to reinforce the upper edge of these side walls I by a suitable strip secured parallel thereto against the outer surface, and to secure to the inner surface thereto next and parallel to the lower edges of said wall cleats $i$, which are each provided with upwardly-projecting pins $j$ near each end. When these side walls I are swung into a longitudinal position parallel to each other, they are connected by a removable floor J of suitable area, which is provided with openings $k$ $k$ and near each end of their side edges, up through which pins $j$ $j$ of each side wall I pass, and thus lock the same together. When the side walls I are thus locked, the glass roof is swung outward, thus causing the cross-head to lower on the guide-cleats and the drop-doors H H' to gravitate into the perpendicular position shown in Figs. 1 and 2.

To fold up the brooder, the glass roof is raised, and then the cross-head to which its inner edge is hinged is lifted until the said glass roof and the drop-doors connected thereto are in the position shown in Fig. 3 of the drawings. The floor J is then lifted, so as to release the side walls I, and is placed flat against the glass roof within the confines of frame A, and then finally the side walls I I are swung like doors against the floor J, which when said side walls are flat against it is lifted slightly and then dropped again, so that its transverse edge can fall between the pins $j$ and side walls I, and thus lock said side walls in their closed position.

The operation of my invention is made apparent by the foregoing description. It will be observed that it embodies all the features necessary to obtain light, warmth, heat, and ventilation in the requisite degree to obtain the best results, while at the same time enabling the operator to have easy access to any part of the coop or brooder to care for the hen or her brood, according as conditions require. It will also be observed that it can be knocked down and folded into a very compact space in such manner that it can be easily carried from place to place or stored away for future use without inconvenience.

What I claim as new is—

1. In a combined coop and brooder the combination with a central rectangular frame, and a suitable open vertical partition arranged transversely across the same at about its center of length, of side walls, suitably hinged to the rear edges of the vertical sides of said central frame, a rear wall removably secured to said side walls, and a removable roof supported by said walls and covering the same, and a knockdown "lean-to" brooder at the other end of said central frame, which together with the aforesaid movable elements constituting the brooder are adapted to be inclosed and confined within said central frame.

2. In a combined coop and brooder the combination with a central rectangular frame, a suitable open vertical partition arranged transversely across the same at about its center of length, and a knockdown "lean-to" coop located at the rear of said frame and adapted to be inclosed and compactly confined in said central frame, of a brooder located at the front of said central frame and comprising suitable side walls hinged to the lower portion of the front edges of the vertical sides of said central frame, a glass roof, the frame of which is vertically adjustable in the upper portion of said rectangular frame in front of said partition and arranged when in use to cover the space between the said side walls, and drop-doors hinged to the outer horizontal edge of said glass roof and arranged to close the front of the brooder.

3. In a combined coop and brooder, the combination with a central rectangular frame having vertical rods, g, secured thereto, and a knockdown coop at one end thereof, of a knockdown brooder at the other end thereof consisting of side walls, a removable floor detachably connected therewith, a cover, h, and drop-doors connected with said cover and forming the end of the brooder, the said cover being hinged to a vertically-movable crosshead, G, mounted between the rods g, substantially as and for the purpose set forth.

4. In a combined coop and brooder the combination with a central rectangular frame, a suitable open vertical partition arranged transversely across the same at about its center of length, and knockdown "lean-to" coop located at the rear of said central frame and adapted to be inclosed and compactly confined in the same, of suitable side walls hinged to the lower portion of the front edges of the vertical sides of said central frame having cleats secured to their inner surfaces next their lower edges and pins projecting vertically therefrom, a removable floor having openings near its side edges up through which said pins pass, a glass roof the sash-frame of which is vertically adjustable in the upper portion of said rectangular frame in front of said partition, and drop-doors hinged to the outer horizontal edges of said glass roof, as set forth.

5. In a combined coop and brooder the combination with a central rectangular frame, a suitable open vertical partition arranged transversely across the same at about its center of length, and a knockdown "lean-to" coop located at the rear of said central frame which is adapted to be inclosed and compactly confined in the same, of suitable side walls hinged to the lower portion of the front edges of the vertical sides of said central frame having cleats secured to their inner surfaces next their lower edges, pins projecting vertically from said cleats, a removable floor having openings at each side up through which said pins are adapted to pass, vertical guide-cleats secured to the inner surface of the vertical sides of the central frame in front of the upper portion of said open partition thereof, a horizontal cross-head adapted to be vertically adjustable on said guide-cleats, a glass roof, the sash of which is hinged to said cross-head and drop-doors hinged to the outer horizontal edges of said glass roof, as set forth.

JOHN R. DIXON.

Witnesses:
WILLIAM S. BARBEE,
E. HICK.